350-6.91
SR
XR 3,597,536

United States

[11] 3,597,536

[72] Inventor Vernon J. Fowler
East Meadow, N.Y.
[21] Appl. No 728,218
[22] Filed May 10, 1968
[45] Patented Aug. 3, 1971
[73] Assignee General Telephone & Electronics Laboratories Incorporated

[54] DUAL BEAM LASER DISPLAY DEVICE EMPLOYING POLYGONAL MIRROR
16 Claims, 7 Drawing Figs.

[52] U.S. Cl. .......... 178/7.3 D, 178/7.6, 250/199, 250/219 I, 350/7
[51] Int. Cl. .......... H04n 3/08
[50] Field of Search .......... 178/7.1 E, 7.3 E, 7.5 D, 7.6; 250/199, 230, 219; 350/7

[56] References Cited
UNITED STATES PATENTS

| | | | |
|---|---|---|---|
| 3,293,655 | 12/1966 | McNamey .......... | 178/7.6 |
| 3,370,504 | 2/1968 | Buck et al. .......... | 178/7.6 |
| 3,436,546 | 4/1969 | Derderian et al. .......... | 178/7.6 |

*Primary Examiner*—Robert L. Griffin
*Assistant Examiner*—Donald E. Stout
*Attorneys*—Robert J. Frank and Joseph H. Roediger

ABSTRACT: A display system utilizing modulated and steered laser beams to scan a display screen is described. The system is capable of operating with the video and deflection signals of conventional color television signals. A dual-beam intensity modulator at the output of each laser is used to resolve the beam therefrom into first and second components. The components are alternately modulated with the video information and spatially separated. These components are directed, at appropriate angles, to a rotating mirror-type horizontal beam scanner which causes the components to alternately scan in a horizontal plane. A vertical beam scanner is positioned at the output of the horizontal scanner. The components alternately emerging from the vertical beam scanner are directed to and raster scan the display screen.

3597536
OR IN 358/63

INVENTOR.
VERNON J. FOWLER

BY Joseph H. Roediger
ATTORNEY.

INVENTOR.
VERNON J. FOWLER

BY Joseph H. Roediger
ATTORNEY.

INVENTOR.
VERNON J. FOWLER

BY Joseph H. Roediger
ATTORNEY.

INVENTOR
VERNON J. FOWLER

BY Joseph H. Roediger
ATTORNEY

DUAL BEAM LASER DISPLAY DEVICE EMPLOYING POLYGONAL MIRROR

BACKGROUND OF THE INVENTION

An important advantage of lasers for both optical radar and electronically-driven display applications is their ability to project narrow beams of extremely high intensity. Spots of light projected on an object tracked by radar or on a display screen and generated by an incoherent source are less bright than their source. Lasers are free of this limitation and readily produce projected spots which are brighter than the source. Also, light spots generated by a laser are many orders of magnitude brighter than those produced by an incoherent source.

One display application for which extremely high spot brightness is required is the projection of television pictures onto a passive screen. A laser display system utilizes a narrow beam of laser light, modulates its intensity, deflects it in the horizontal and vertical planes at the appropriate scan frequencies to form a raster and then projects the pattern on a display screen. Since the laser display system utilizes light of different colors (i.e. wavelengths), the dispersive effects exhibited by nonmechanical laser beam scanning devices heretofore utilized have required separate scanners for each beam. The synchronization of a number of beam scanners requires relatively complex deflection signal processing circuits in order to compensate for the dispersion and to provide equal-size rasters for the red, green and blue beams. These undesirable dispersive characteristics are exhibited by beam scanning devices utilizing the electro-optically controlled refraction in crystals and acoustic wave variations in the index of refraction of liquids.

Consequently, the utilization of reflecting devices, rather than wavelength-dependent refraction devices, has been proposed for laser display systems. One type of beam scanning device that is capable of providing both the required registration of the deflected beams and the relatively high resolution of several hundred spot diameters utilizes vibrating mirrors driven by piezoelectric shear elements. Devices of this type are described in the copending Pat. applications Ser. No. 518,324 filed Jan. 3, 1966 and Ser. No. 695,142 filed Jan. 2, 1968. The standard television 15.75 kHz. sawtooth scan signal is characterized by a short 9 $\mu$sec. blanking interval between successive horizontal lines. The retrace of the scanning beam is required to take place during this short interval and, in practice, piezoelectrically driven mirrors do not reliably provide this rapid retrace.

In addition, a nutating mirror with a fiber optic scan converter has been utilized in laser projection systems. The performance of this type of scanning device has been found to be limited in several respects. For example, the output beam is dispersed by the fiber bundles so that the minimum beam divergence angle is about 20 times the diffraction limited value. As a result, the succeeding scanner (hereinafter referred to as the vertical scanner) and the output optical elements must accommodate a beam 20 times larger. Also, this type of scanner requires optic elements to recollimate the output beam as it emerges from the fiber bundles.

Alternatively, the use of rotating mirrors to provide a high resolution, dispersion-free beam scanning device has been proposed. The major difficulty with this type of device is the requirement that the mirrors, typically polygonal, be driven at high, constant-rotational speeds in order to provide a scan pattern having the short retrace interval required by the standard television signal. The retrace interval is the time between successive scan lines during which the edges of the polygon cross the beam. In these intervals, the beam is divided and scalloped, thereby dimming and diffracting the output beam. In order for each of these intervals to be about 10 percent of the scan period, each face of the polygonal mirror must be 10 times longer than the diameter of the laser beam. This necessitates the use of a large polygonal mirror rotating at a very high speed. In practice, the operating speed required produces substantial internal stresses in the mirror structure. Furthermore, the large moment of inertia of the mirror structure renders it difficult to achieve stabilization and synchronization during operation. Consequently, the use of the rotating mirror type of beam scanner at the high scan rates required by the conventional transmitted television signal has been heretofore limited.

The present invention is directed to the provision of a beam scanner which utilizes a relatively small rotating polygonal mirror structure and essentially eliminates the difficulties previously encountered in scanning a laser beam in a television display system.

SUMMARY OF THE INVENTION

This invention relates to a laser display system wherein the output beam of light from a laser is intensity modulated in accordance with the information to be displayed and then steered at relatively high scan rates to a screen for display.

In the present display system, the output beam from a laser is directed to a composite intensity modulation and beam scanning device. The combination includes an intensity modulator positioned to receive the output beam from the laser and means for applying first and second modulating signals thereto. The modulator is characterized by the fact that it resolves its input beam into first and second component beams and varies the intensity of these component beams in accordance with the applied modulating signals.

The first modulating signal is essentially a square wave having first and second voltage levels. The magnitude of the second or higher level is equal to that required for the full modulation of the input beam. The first or low level produces essentially no modulation of the input beam. As a result of the square wave modulating signal, the first and second light components from the modulator alternate between full and zero intensity. The second modulating signal, hereinafter referred to as the video signal, contains the information to be displayed and is superposed on the square wave signal. The video signal varies the relative intensities of the first and second components emerging from the output end of the modulator. During the half-cycle when the square wave is at the first or lower voltage level, the second component contains the video modulation required to display a positive image. In the next half-cycle, the first component contains the video modulation for a positive image display.

The image is displayed upon a screen by the formation of a raster scan of alternating first and second light components. A television image display is provided by applying a square wave signal to the modulator which is at a frequency equal to one-half of the line scan frequency, i.e. 15.75 kHz. in television applications, and which is synchronized with the beam scanning means providing the line scanning. This square wave signal has the video information for the display of the television image superposed thereon.

The first and second light components from the modulator are directed to a first beam scanning means which provides the horizontal line scan pattern. The first beam scanning means includes a synchronously rotating $n$-sided polygonal mirror. A means for directing the first and second components from the modulator at different angles toward adjacent areas on the perimeter of the polygon is interposed between the modulator and the first scanning means.

Each of the $n$-sides or faces of the polygonal mirror is approximately twice the diameter of the component beam. Thus, as one component beam strikes a corner of the polygon the other beam is centrally located on the face of an individual mirror. When a component beam travels across an individual mirror due to the rotation of the polygonal structure, the angles of incidence continually vary and, thus, the reflected component beams sweep across a display screen. By utilizing dual component beams, the beams alternately generate a one-dimensional scan pattern.

The polygonal mirror is rotated in synchronism with the modulating signals applied to the modulator so that the appropriate video information is present on the particular component beam that is centrally located on the mirror face and the transition between the levels of the first modulating signal does not occur during the generation of a line scan. Accordingly, means for synchronizing the rotation of the mirror with the first modulating signal are provided. When one component beam is centrally located, the other component beam is split or scalloped by its transition across the edge of adjacent mirrors. To insure that the rotary mirror is maintained in synchronism with the modulating signal, photodetecting means may be positioned to determine either the start or the completion of the line scans forming the raster. The signal from the photodetecting means is fed back to a phase comparator which is coupled to the drive means of the rotating mirror.

Due to the generation of two component beams in the modulator and their alternate modulation in synchronism with the rotation of the polygonal mirror, the transit-time limitation associated with the crossing of a beam over the edge between successive mirror faces, i.e. the retrace interval, is obviated. In addition, the two beam components are provided by the same modulator producing the intensity variations in accordance with the video information. Furthermore, the ability to utilize a rotating mirror structure wherein the individual mirror faces are only twice the diameter of the component beam enables the peripheral velocity of the mirror structure to be substantially lower than that required by single rotating beam scanners. As a result, the kinetic energy stored in the rotating mirror is orders of magnitude lower than that stored by single beam scanners.

The foregoing summary has referred to a single color or monochrome display system. However, the present system may be utilized in a multicolor display system wherein one or a plurality of lasers are utilized. In this type of operation, a modulator is provided for each color beam. Each modulator produces first and second component beams. The first components are all combined to form a collinear first composite beam by appropriate optical combining means, i.e. mirrors, dichroic devices and the like. Also, the second beams are combined in a like manner to form a second composite beam. The first and second composite beams are then directed to a beam scanner as previously discussed.

In the case of a television display system, the output of the first rotary mirror beam scanner is driven to provide a 15.75 kHz. scan rate and the line scan so produced is directed to a second slower or vertical beam scanner to complete the required raster scan. Further features and advantages of the present invention will become more readily apparent from the following detailed description of specific embodiments when taken in conjunction with the accompanying drawings.

DESCRIPTION OF THE PREFERRED EMBODIMENTS

Figure 1:
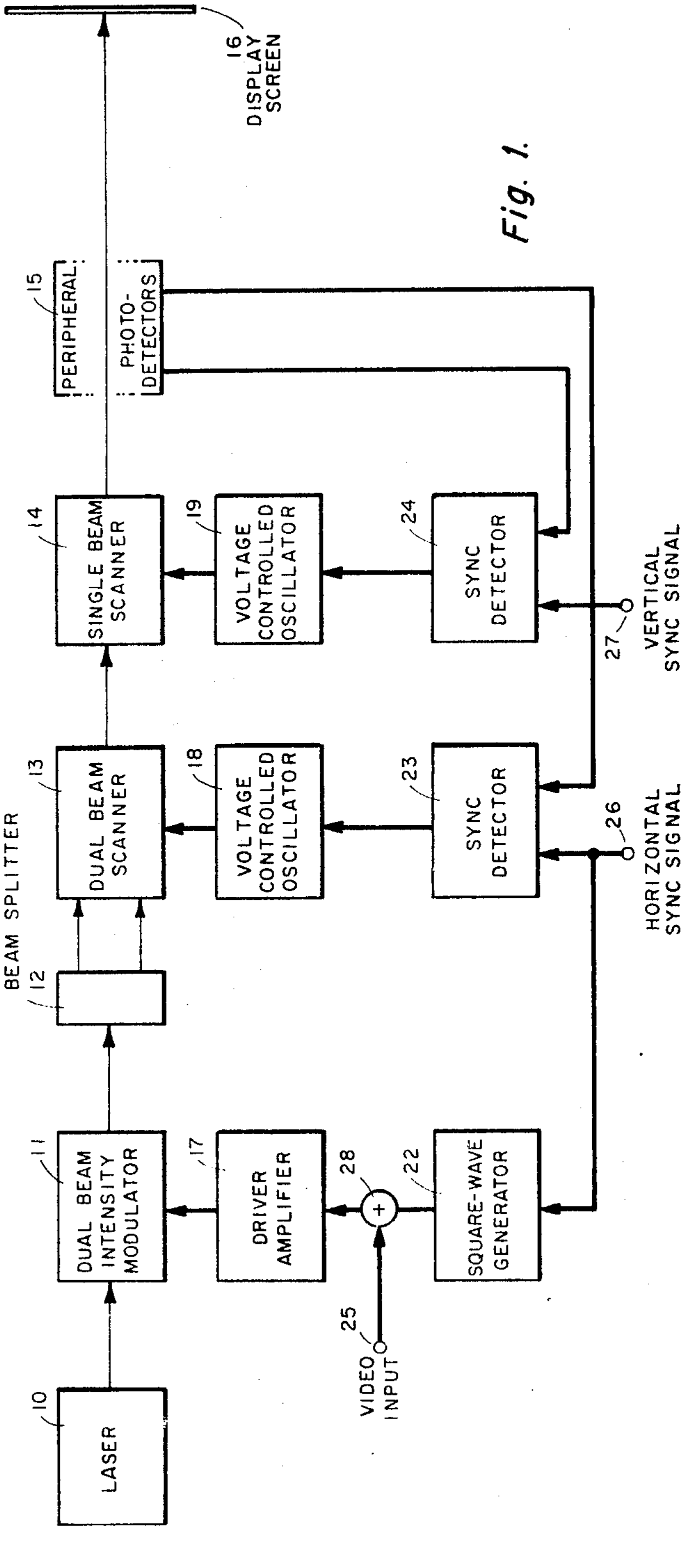
FIG. 1 is a block schematic diagram of one embodiment of the invention utilized to provide a monochrome display.

Referring now to FIG. 1, a laser display system for projecting monochrome images on a display screen 16 is shown. The system includes laser 10, for example, an ion gas laser which produces a collimated beam of light in the visible portion of the spectrum at a power level adequate for illuminating a display screen.

The beam of light from laser 10 is directed to dual beam intensity modulator 11. The modulator is characterized by the fact it resolves the input beam from laser 10 into first and second component beams and intensity modulates each of the component beams. The total power in the two beams is essentially constant and equal to the total power from the laser, less a small loss resulting from passage through the modulator. Thus, a video modulation signal applied to the modulator produces increases in the brightness of one of the component beams with increased signal voltage (positive video modulation) and simultaneously produces decreases (negative video modulation) in the brightness of the other component beam. Thus, nearly the full laser power is used for highlight brightness in the projected image. The electro-optic and acousto-optic modulators are representative of the type of modulator which can be employed. In the case of a light modulator utilizing the electro-optic effect of crystals, the input beam is resolved into first and second collinear orthogonally polarized composite beams. The term orthogonally polarized refers not only to plane polarized first and second component beams where the respective planes of polarization vary by 90°, but also to the case wherein the first and second component beams are respectively left- and right circularly polarized. These two component beams emerge from the output of the modulator in a collinear manner and are directed to polarization beam splitter 12. The beam splitter is typically a calcite crystal which physically separates the two component beams. One type of electro-optic light modulator found especially well suited for use in the present invention is the compensated birefringence modulator described in U.S. Pat. No. 3,304,428 issued Feb. 14, 1967 to C. J. Peters and assigned to Sylvania Electric Products Inc.

However, other types of modulators may be employed. One example is a light modulator utilizing the change in the index of refraction of a solid or liquid upon the application of acoustic waves to provide first and second component beams which are not collinear. In an embodiment utilizing a light modulator of this type, the beam splitter 12 may be omitted. One type of acousto-optic modulator suitable for use in the present system is referred to in the art as a Bragg diffraction cell and relies upon the formation of a diffraction grating by an acoustic wave as it propagates through a liquid medium, such as water. The acoustic power supplied produces travelling density variations in the medium with a periodicity equal to the sonic wavelength. The laser beam entering the modulator travels across the acoustic wave and is resolved into a diffracted component and a component travelling in the direction of the incident beam. A more detailed description of this type of modulator is found in an article entitled "A Television Display Using Acoustic Deflection and Modulation of Coherent Light" by A. Korpel, R. Adler, P. Desmares, and W. Watson, and found in the Proceedings of the IEEE, Vol. 54, No. 10, at page 1429 FF.

Figure 2:
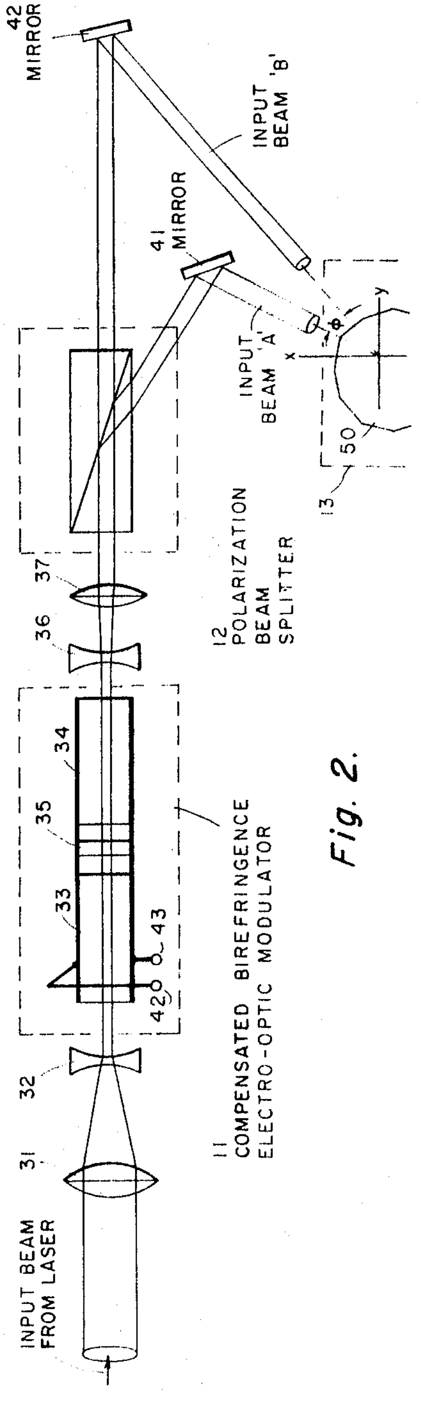
FIG. 2 is a more detailed diagram of particular elements of the embodiment of FIG. 1.

Polarization modulation provides a convenient method for supplying dual modulated beams with the power transferred back and forth between the two beams in the modulation process. The modulator 11 provides the required dual beam output in accordance with an applied signal from square wave generator 22 via drive amplifier 17. Referring now to FIG. 2, the laser beam is reduced by lenses 31 and 32 and then directed to the electro-optic light modulator 11. The demagnified input beam from laser 10 is passed through a pair of potassium dihydrogen phosphate electro-optic crystals 33 and 34 having a half-wave plate 35 therebetween. The crystals convert a portion of the input polarized light beam to a component beam polarized in the orthogonal direction upon the application of a voltage thereacross. The conversion takes place for circularly polarized as well as plane polarized input beams. If no voltage is applied, the output from the laser travels through the modulator essentially undisturbed. Since the system utilizes both components, albeit alternately, an output polarizer, shown in FIGS. 1 and 2 of U.S. Pat. No. 3,304,428, which absorbs or removes light of the original polarization is not required at the output end of the modulator. Consequently, essentially the entire output of the light source can be utilized during a line scan by the corresponding component beam. Lenses 36 and 37 located at the output of the modulator increase the diameter of the modulated components. The use of these lenses and the resultant magnification is determined by the spot size desired in a particular application.

In operation, in the absence of a video signal, the application of a square wave signal between terminals 42 and 43 of the modulator 11 of a magnitude sufficient to provide full modulation of the incident laser beam causes the first and second components to alternately appear at the output end of the modulator. During the half-cycle that the square wave is zero, the first component has full intensity and the second component essentially 0 intensity. When the square wave is at its high level, the relative intensities of the beams are reversed. As shown in FIG. 1, the video input signal is applied at terminal 25 and superposed on the square wave drive signal by addition circuit 28. The polarity of the video signal is chosen, in the case wherein a positive image is to be displayed, so that during the half-cycle that the square wave drive is zero, the second component contains positive video information and the first component contains negative video information. During the other half-cycle, the first component beam is positively modulated and the second beam is negatively modulated. Thus, the first and second components are alternately intensity modulated by the video information. As will be seen from later discussion of the scanning means, each beam when positively modulated will be projected on the display screen while the other beam with negative modulation is blocked from view. The simultaneous provision of negative video modulation is due to the fact that electro-optic and acoustic light modulators produce sinusoidal variations in the intensities of the emerging component beams with applied modulating signal.

The square wave drive signal provided by generator 22 is synchronized with the horizontal sync signal applied at terminal 26 and has a frequency which is equal to half of the line scan frequency. In a conventional television display, the line scan frequency is standardized at 15.75 kHz.

Since the first and second components from modulator 11 are collinear when they emerge, polarization beam splitter 12 is interposed between the output end of modulator 11 and the dual beam scanner 13 to insure that the components are spatially distinct. The dual beam scanner provides the horizontal line scan pattern necessary for the image display. The scanner includes a rotating polygonal mirror which is driven by a motor. The speed of the drive motor is determined by the frequency of voltage controlled oscillator 18 which is controlled by the result of a phase comparison between the horizontal sync signal and an internally produced signal from the peripheral photodetectors 15. The phase comparison is performed by sync detector 23 which provides an output voltage having a magnitude which is a function of the phase difference of the signals applied thereto.

The dual beam scanner 13, which is later described in more detail, provides a horizontally line scanned output beam which contains the first and second components during the intervals that they contain the positive video information. Thus, the first and second components are alternately present at the output of the dual beam scanner. This result is obtained by directing the first and second components at the polygonal mirror 50 so that the beam spots are adjacently positioned on the individual faces or sides of the mirror and an angle Φ exists between the incident components. The incident component beams are shown in FIG. 2. In this configuration the polygonal mirror 50 is a simple polygon with its axis perpendicular to the X–Y plane, which plane contains the axial rays of the two input beams "A" and "B." The output beams are shown in detail in FIGS. *3a*, *3b* and *3c*. It shall be noted that the components intersect at the origin of the X–Y coordinate axes. This point of intersection need not be on the surface of the mirror and, in practice, resides within the polygon. With the beams thereby illuminating different areas of the polygonal mirror, rotation of the mirror causes the component beams to be traversed alternately by the boundary between adjacent reflecting faces. While one of the beams is being cut, the other is fully incident on one of the mirror faces. The beams are oriented with respect to the polygonal mirror and the projection screen so that when either beam is fully on a mirror face it is reflected to the projection screen, whereas when it is being cut by a corner of the polygon, the two adjacent mirror faces reflect the beams to the left and to the right of the projection screen. The beam projected to the screen has positive video modulation, thereby producing a positive image on the screen. The beam projected to the sides of the screen (which in practice would be masked off near the scanner) would have a negative video modulation. As the polygonal mirror rotates, the components travel, in adjacent registration, across the individual faces of the mirror. Since the position of the face with respect to the components is continually changing, the angle of reflection also changes with the result that the component beam scans along a horizontal line (assuming a vertical rotation axis for the mirror structure).

The orientation of mirrors 41 and 42, shown in FIG. 2, determine the angle Φ between the component beam. Due to the fact that the incident components form an angle Φ therebetween, the reflected components are distinct and separated when reflected by the same face of the polygonal mirror. By making the individual faces of the mirror structure approximately twice the component beam diameter and utilizing the central portion of each face as the effective reflecting surface for each line scan, the components are utilized in a manner which enables them to scan alternate lines with a very small retrace interval therebetween. In an embodiment wherein the individual mirror faces are at least twice the component beam diameter, the retrace is essentially zero since it is determined by the square wave switching time which is of the order of a microsecond. The first component is essentially in position to begin its line scan when the second component completes its scan.

Referring now to FIG. 1, the horizontal line scan pattern provided by the output beam of the dual beam scanner 13 is supplied to single beam scanner 14 which is oriented to steer the beam in a direction orthogonal to the line scan and thereby generate the 60 Hz. vertical scan pattern required by the conventional television signal. The single beam scanner 14 may be a rotating mirror, a piezoelectrically driven oscillating mirror or a large-angle d'Arsonval ballistic galvanometer driven mirror. Due to the relatively low scanning rate of the vertical beam scanner, considerable latitude is allowed in selecting the particular single-beam scanner employed.

The rate at which beam scanner 14 is driven is determined by voltage controlled oscillator 19. The oscillator frequency is controlled by the output voltage of sync detector 24 which is determined by the result of a phase comparison between a signal from the peripheral photodetectors 15 and the vertical sync signal applied at terminal 27. The beam emerging from the single beam scanner is directed to display screen 16 whereupon it forms a raster scan and displays an image in accordance with the video information applied at terminal 25. As shown, photodetectors 15 are placed between the display screen and the single beam scanner and are positioned so as to monitor the emerging beam at the extremities of the scan pattern.

The dual beam scanner 13 which utilizes an *n*-sided polygonal rotating mirror to generate the horizontal line scan with a dual beam input is shown in FIGS. *3a*, *3b* and *3c*. The direction of rotation of the mirror structure is clockwise as indicated by the arrows. In conformity with FIG. 2, input beam A and input beam B are separated from each other by an angle Φ. The angle Φ is determined by the number of faces *n* of the polygonal mirror by the following relationship $\Phi=360/n$. The number of individual faces of the mirror structure and the rotational speed thereof are selected to provide the desired scan rate. In the embodiment shown, the polygonal mirror was constructed with 12 faces and driven at 39,375 revolution per minute to provide the conventional 15,750 Hz. horizontal sweep frequency. The angle Φ was 30°.

Figures 3A, 3B, 3C:
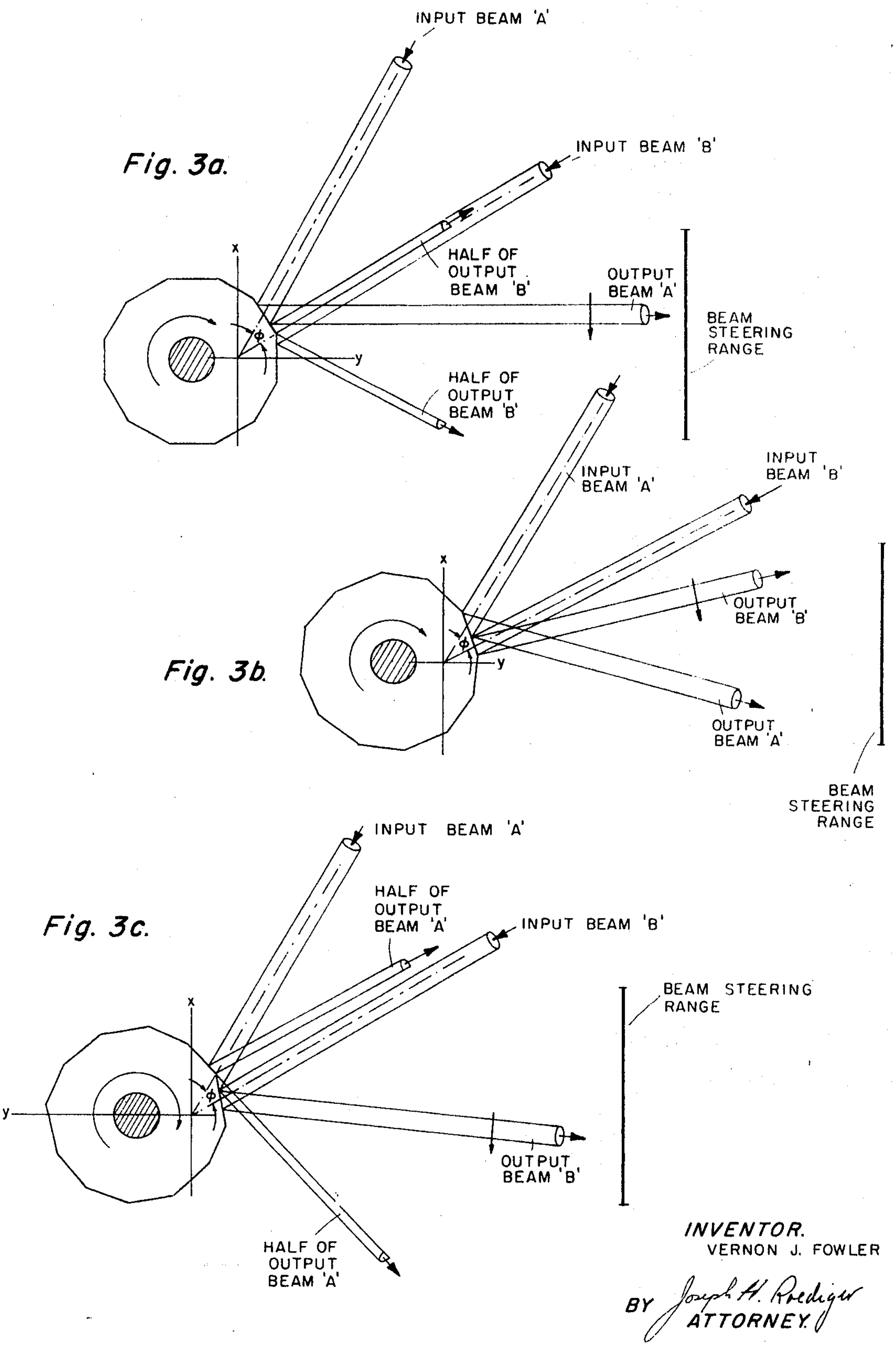
FIGS. 3*a*, 3*b* and 3*c* are diagrams showing the operation of the dual beam scanner of the embodiment of FIG. 1.

In connection with FIG. 3*a*, the input beam A is incident upon the central portion of a face of the polygonal mirror and is reflected without being split. The output beam A is shown in the center of the beam scanning range and is moving in the direction indicated by the arrow (downward) as the polygon continues to rotate. At this time, the input beam B is incident upon the intersection between adjacent faces and is, therefore, split in reflection. One-half of the beam B is reflected back upon itself while the other half is reflected downward out of the beam scanning range.

In FIG. 3*b*, the polygonal mirror structure has rotated so that both beams A and B are incident upon the same face and are not split by a transition between faces. At this time, output beam A has completed its line scan and is about to be split. However, output beam B has recombined and is in position to start its scan of the beam scanning range. In FIG. 3*c*, the output beam A has been split due to the rotation of the polygonal mirror while beam B has completed in excess of one-half of its scan of the range. By making the width of the individual faces of the mirror structure twice the diameter of the input beam components and using the dual beams, the retrace interval is essentially zero.

The foregoing description of the dual beam scanner utilizing a 12 polygonal mirror shows that a single rotation of the mirror produces 12 sweeps of each of the two output beams. While the total scan angle defining the beam scanning range is substantially 2 Φ or 60° per sweep, the outer excursions of each sweep are not normally used due to the splitting of the beam into two reflected components during the transitions between adjacent faces. In practice, the central Φ° of each sweep are utilized. Thus, the dual beam scanner provides an alternate scan of the central Φ° portion of the range such that as one beam completes the line scan, the next beam starts with effectively zero retrace time thereby providing 24 sweeps with each complete rotation oi the 12-sided mirror.

In contrast with a single beam scanner, the dual beam scanner enables the mirror size to be reduced substantially. For example in applications wherein a beam scanner is required to operate with a 10 percent retrace interval, the mirror length for a single beam scanner is required to be 10 times larger than the beam diameter so that split reflections occur only during the retrace period. In addition, the operation of the rotating mirror with a single beam provides only one line scan for each face whereas the present system provides two line scans. The reduction in the physical dimensions of the dual beam scanner and the number of faces is found to provide a significant advantage when compared with a single beam scanner designed to operate with a 15.75 kHz. sweep frequency, 10 percent retrace interval and 30° scanning range. For example in the case of 0.12 cm. diameter laser beam, the peripheral velocity of the rotary mirror structure in the dual beam scanner is 76 ft./sec. in contrast with 690 ft./sec. for the single beam scanner. Significantly, the dual beam scanner has a kinetic energy of less than 1 joule while the single beam scanner has a kinetic energy in excess of 6000 joules. As a result of the relatively low peripheral velocity, the individual mirrors in the present system are operated far below their strain limit and distortion is substantially reduced. The low stored kinetic energy improves stabilization and synchronization while at the same time reducing both the drive power requirements and the potential safety hazards due to the rupture of a mirror.

Figure 4:
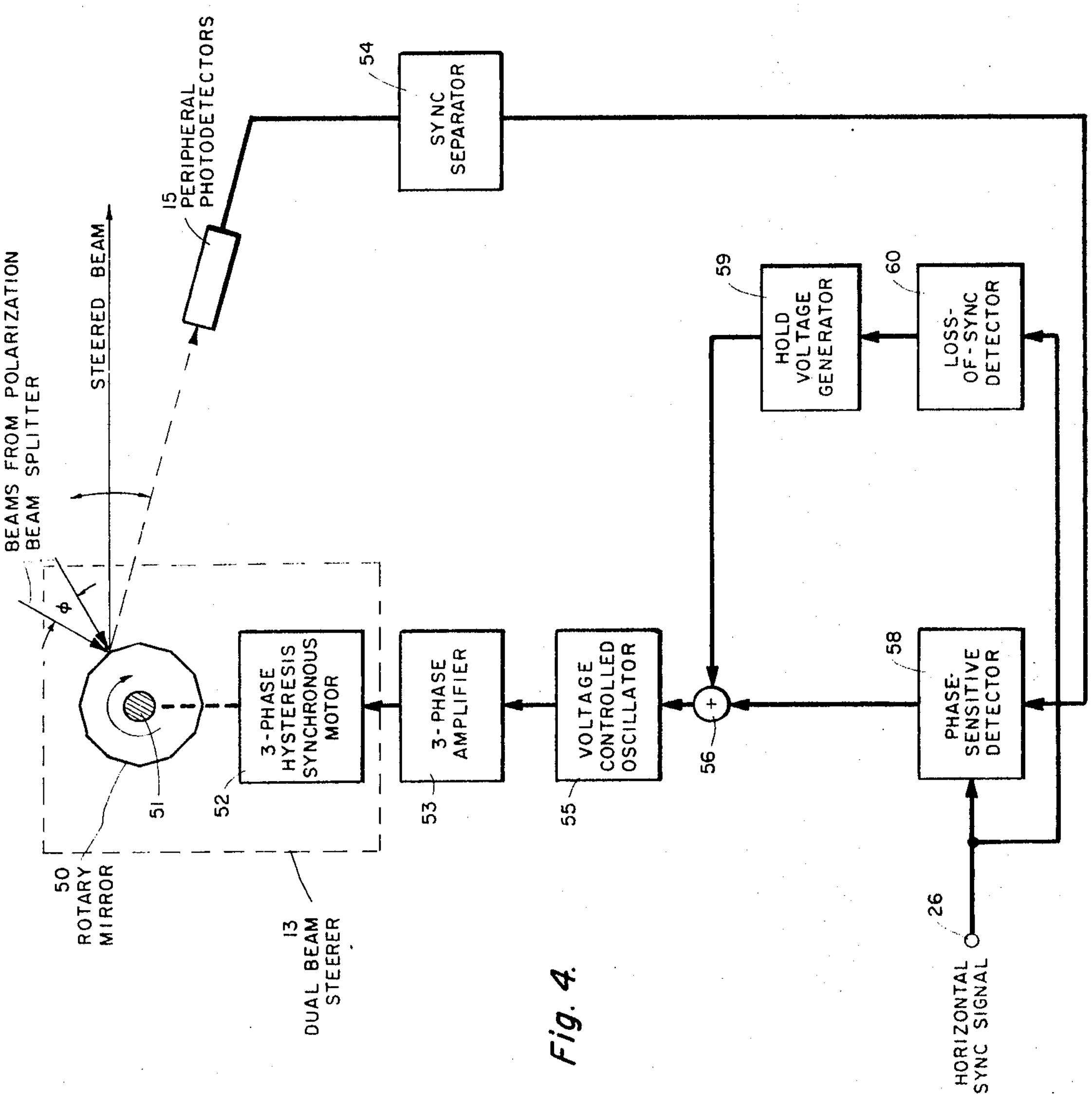
FIG. 4 is a block schematic diagram of the drive and synchronization circuits for the dual beam scanner of the embodiment of FIG. 1.

One type of drive and synchronization circuit for the dual beam scanner is shown in block schematic form in FIG. 4. The beam scanner 13 includes the polygonal mirror structure 50 which is driven about shaft 51 by a three-phase hysteresis synchronous motor 52. The synchronization of the rotating mirror 50 and the resulting scan pattern with the horizontal sync signal of the received television signal is accomplished by means of a phase-locked loop containing sync separator 54 which receives the signals from the peripheral photodetectors 15 and supplies the locally generated sync signal to phase-sensitive detector 58. The phase-sensitive detector compares the relative phases of the received horizontal sync signal at terminal 26 with local sync signal and generates an error signal which is a function of the phase difference therebetween. The error signal is supplied to a voltage-controlled oscillator 55 which supplies, via three-phase power amplifier 53, the appropriate drive signal for motor 52. The nominal frequency of the oscillator 55 is determined for a particular scan frequency by the number of poles of the motor 52 and the number of faces of the polygonal mirror. In addition, a loss-of-sync detector 60 and a hold voltage generator 59 are provided to eliminate the effect of an accidental loss of the received sync signal. It shall be recognized that many forms of synchronizing systems may be employed and, in certain applications, the peripheral photodetectors, sync separator and the loss-of-sync detectors may be eliminated in the dual beam scanner drive system. In this case, the motor 52 can be driven by the output signal from an oscillator which is maintained in synchronism with the received horizontal sync signal.

Figure 5:
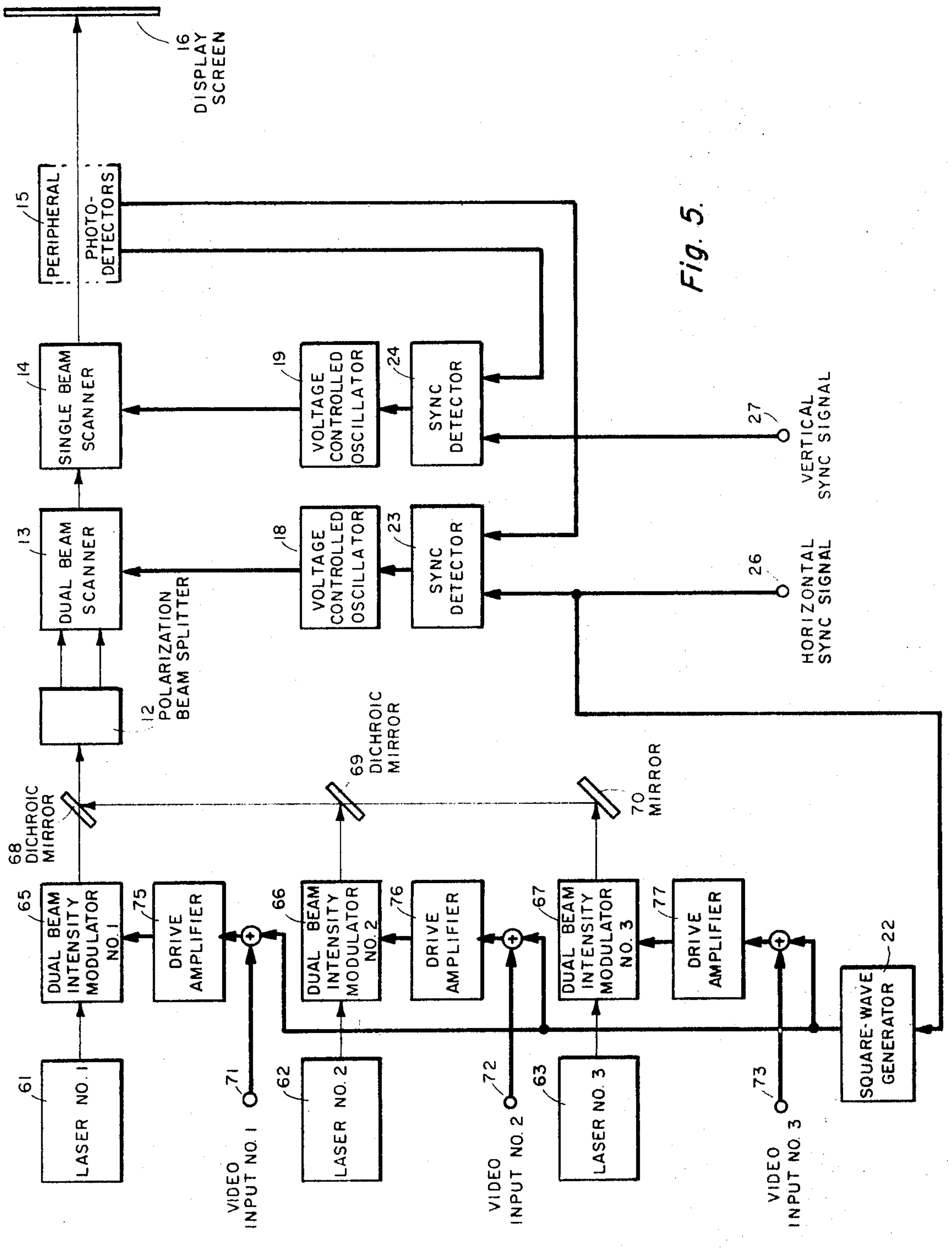
FIG. 5 is a block schematic diagram of a second embodiment of the invention for providing a multicolor display.

Referring now to FIG. 5, a color television display system is shown wherein lasers 61, 62 and 63 each provide a beam of light of a single color, normally red, green and blue respectively. The output beam of each laser is directed to a corresponding one of dual beam intensity modulators 65, 66 and 67. The modulators are similar in all respects to the electro-optic modulator described in connection with the embodiment of FIG. 1. Each modulator resolves its input beam into first and second collinear components in accordance with the square wave drive signal provided by generator 22. In the absence of video modulation, the square wave drive results in the modulators simultaneously providing first component beams of maximized intensity. However, the square wave signal supplied to a particular modulator has the video information corresponding to a particular color superposed thereon. As shown, video input terminals 71, 72 and 73 are coupled via drive amplifiers 75, 76 and 77 respectively, to the corresponding modulators 65, 66 and 67.

The output of each modulator includes first and second orthogonally polarized components alternately containing positive video modulation. As shown, the component beams from modulator 67 are reflected by mirror 70, pass through dichroic mirror 69 and reflected by dichroic mirror 68 to polarization beam splitter 12. The component beams from modulator 66 are transmitted by dichroic mirror 69 and reflected by dichroic mirror 68. In addition, the component beams from modulator 65 are transmitted by dichroic mirror 68. The dichroic mirrors 68 and 69 and the mirror 70 are positioned so that all of the component beams are collinear when they enter polarization beam splitter 12. As mentioned previously in connection with the embodiment of FIG. 1, the beam splitter passes a component polarized in one direction without deflection while it passes and deflects a component polarized in the orthogonal direction. By forming the crystals used in the beam splitter, typically a calcite prism, so that both component beams enter and emerge in a direction normal to the surface of the crystal the beam splitter can be made nondispersive.

In operation, the modulators 65, 66 and 67 are positioned so that the polarization directions of all the first component beams are coincident. As a result, all first component beams are collinear when they emerge from the beam splitter and comprise a single input beam to the dual beam scanner 13. Similarly, the deflected second component beams are collinear and comprise the second input beam to scanner 13. The operation of the dual beam and single beam scanners 13 and 14 in the embodiment of FIG. 5 is similar to that described in connection with the embodiment of FIG. 1.

While the above description has referred to specific embodiments of the invention, it shall be recognized that many variations and modifications may be made therein without departing from the spirit and scope of the invention.

What I claim is:

1. In a display system wherein a beam of light is modulated in accordance with an information signal and steered to scan a display screen, the combination which comprises:

a. modulator means positioned in the path of the beam of light, said modulator means resolving said beam into first and second component beams and modulating the intensity thereof in accordance with the information signal;

b. beam scanning means containing a polygonal mirror having a plurality of reflecting faces, said mirror being rotatable about an axis of rotation, and c. means interposed between said modulator and beam scanning means for directing said first and second component beams to adjacent positions on said rotating polygonal mirror and for making the axes of said beams coplanar with an angle Φ therebetween, the orientation of said beams with respect to said polygonal mirror being such that said first and second component beams are alternately traversed by a boundary between adjacent reflecting faces, the first of said component beams being fully incident on a reflecting face during traversal of the second beam, the rotation of said polygonal mirror resulting in the alternate scanning of the screen by said first and second component beams.

2. The combination of claim 1 further comprising means for applying first and second modulating signals to said modulator means, said first signal alternating between first and second voltage levels and said second signal containing the information to be displayed whereby said first and second components are alternately modulated with positive display information.

3. The combination of claim 2 wherein said beam scanning means contains means for rotating said polygonal mirror in synchronism with the first modulating signal applied to said modulator means whereby the transition between levels of said first modulating signal occurs prior to the generation of the next line scan.

4. The combination of claim 1 wherein each face of the polygonal mirror has a width which is approximately twice the diameter of a component beam.

5. The combination of claim 1 wherein said polygonal mirror has $n$ individual faces and the means for directing said first and second components to adjacent positions on the mirror provides an angle Φ between said components which is equal to $360/n$.

6. The combination of claim 1 wherein each face of the polygonal mirror has a width which is not less than twice the diameter of a component beam whereby the retrace interval between successive line scans is minimized.

7. The combination of claim 1 further comprising a vertical beam scanner positioned to receive the line scan generated by said beam scanning means, said vertical scanner being oriented to steer an incident beam in a direction orthogonal to the line scan and thereby provide a raster.

8. A display system for providing a television image on a display screen which comprises:

a. means for providing a beam of light;

b. an intensity modulator positioned in the path of said beam of light, said modulator resolving said beam into first and second intensity-modulated component beams;

c. means for applying first and second modulating signals to said modulator, said first signal having a square waveform, said second signal containing the video information to be displayed, said first and second signals providing alternate modulation of said first and second components with positive video information, d. a dual beam scanner containing a rotating polygonal mirror having $n$ reflecting faces, each of said faces having a width which is approximately twice the diameter of a component beam;

e. means interposed between said intersecting modulator and dual beam scanner for directing said first and second component beams to adjacent positions on said rotating polygonal mirror and for making the axes of said beams coplanar with an angle Φ therebetween, the orientation of said beams with respect to said polygonal mirror being such that said first and second component beams are alternately traversed by a boundary between adjacent reflecting faces, the first of said component beams being fully incident on a reflecting face during traversal of the second beam, the rotation of said mirror resulting in the alternate scanning of a line by said first and second component beams, f. a single beam scanner positioned to receive the line scan generated by said dual beam scanner, said single beam scanner providing deflection in a direction orthogonal to the line scan and thereby provide a raster on the display screen.

9. The display of claim 8 wherein said means for directing said first and second components to adjacent positions on the mirror provides an angle Φ therebetween which is equal to $360/n$.

10. The combination of claim 8 further comprising means for applying first and second modulating signals to said modulator, said first signal alternating between first and second voltage levels and said second signal containing the information to be displayed whereby said first and second components are alternately modulated with positive display information.

11. The display of claim 8 wherein said intensity modulator is an electro-optic light modulator and further comprising a beam splitter positioned at the output of said modulator for spatially separating the first and second component beams.

12. The display of claim 8 further comprising:

a. photodetecting means interposed between the single beam scanner and the display screen for providing output signals in accordance with the generation of the raster, and b. sync detection means coupled to said photodetecting means for comparing the signals from said photodetecting means with the received sync signals and generating corrective signals accordingly, said corrective signals being supplied to the beam scanners.

13. A display system for providing a color television image on a display screen which comprises:

a. means for providing first, second and third beams of light of different wavelengths;

b. first, second and third intensity modulators, each of said modulators being positioned in the path of the corresponding beam of light, each modulator resolving its beam into first and second intensity-modulated component beams;

c. means for combining the first component beams from said modulators to form a first composite beam and for combining the second component beam from said modulators to form a second composite beam;

d. means for applying first and second modulating signals to each of said modulators, said first signal having a square waveform, said second signal containing the color video information corresponding to a particular modulator, said first and second signals providing alternate modulation of said first and second components with positive video information;

e. a dual beam scanner containing a rotating polygonal mirror having $n$ reflecting faces, each of said faces having a width which is approximately twice the diameter of the composite;

f. means interposed between said intensity modulators and dual beam scanner for directing said first and second component beams to adjacent positions on said rotating polygonal mirror and for making the axis of said beams coplanar with an angle Φ therebetween, the orientation of said beams with respect to said polygonal mirror being such that said first and second component beams are alternately traversed by a boundary between adjacent reflecting faces, the first of said component beams being fully incident on a reflecting face during the traversal of the second beam, the rotation of said mirror resulting in the alternate scanning of a line by said first and second component beams; and g. a single beam scanner positioned to receive the line scan generated by said dual beam scanner, said single beam scanner providing deflection in a direction orthogonal to the line scan and thereby providing a raster on the display screen.

14. The combination of claim 1 wherein the plane formed by the axes of said first and second component beams is perpendicular to the axis of rotation of said polygonal mirror.

15. A display system for providing a color television image on a display screen which comprises:

a. means for providing first, second and third beams of light of different wavelengths;

b. first, second and third intensity modulators, each of said modulators being positioned in the path of the corresponding beam of light, each modulator resolving its beam into first and second intensity-modulated component beams;

c. means for combining the first component beams from said modulators to form a first composite beam and for combining the second component beam from said modulators to form a second composite beam;

d. means for applying first and second modulating signals to each of said modulators, said first signal having a square waveform, said second signal containing the color video information corresponding to a particular modulator, said first and second signals providing alternate modulation of said first and second components with positive video information;

e. a dual beam scanner containing a rotating polygonal mirror having *n* reflecting faces, each of said faces having a width which is approximately twice the diameter of the composite;

f. means interposed between said intensity modulators and dual beam scanner for directing said first and second component beams to adjacent positions on said rotating polygonal mirror and for making the axis of said beams coplanar with an angle $\Phi$ therebetween, the orientation of said beams with respect to said polygonal mirror being such that said first and second component beams are alternately traversed by a boundary between adjacent reflecting faces, the first of said component beams being fully incident on a reflecting face during the traversal of the second beam, the rotation of said mirror resulting in the alternate scanning of a line by said first and second component beams; and g. a single beam scanner positioned to receive the line scan generated by said dual beam scanner, said single beam scanner providing deflection in a direction orthogonal to the line scan and thereby providing a raster on the display screen.

16. The display of claim 15 wherein said means for directing said first and second composite beams to adjacent positions on the mirror provides an angle $\Phi$ therebetween which is equal to $360/n$.